US010379464B2

(12) United States Patent
Muramatsu et al.

(10) Patent No.: US 10,379,464 B2
(45) Date of Patent: Aug. 13, 2019

(54) ELECTROPHOTOGRAPHIC MEMBER, FIXING MEMBER, FIXING APPARATUS, IMAGE FORMING APPARATUS, AND METHOD OF PRODUCING ELECTROPHOTOGRAPHIC BELT

(71) Applicant: CANON KABUSHIKI KAISHA, Tokyo (JP)

(72) Inventors: Hiroki Muramatsu, Tokyo (JP); Toshinori Nakayama, Kashiwa (JP); Kota Arimoto, Kashiwa (JP); Masayuki Tamaki, Abiko (JP); Yusuke Yamaguchi, Nagareyama (JP); Ryo Yashiro, Tokyo (JP); Matsutaka Maeda, Kawasaki (JP); Yuji Kitano, Tokyo (JP); Yoshihito Oshima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 221 days.

(21) Appl. No.: 15/670,179

(22) Filed: Aug. 7, 2017

(65) Prior Publication Data

US 2018/0046117 A1 Feb. 15, 2018

(30) Foreign Application Priority Data

Aug. 10, 2016 (JP) ................................ 2016-157649

(51) Int. Cl.
*B32B 9/04* (2006.01)
*G03G 15/20* (2006.01)
*G03G 15/16* (2006.01)

(52) U.S. Cl.
CPC ....... *G03G 15/2003* (2013.01); *G03G 15/162* (2013.01); *G03G 15/1615* (2013.01); *G03G 15/2057* (2013.01); *G03G 2215/2035* (2013.01)

(58) Field of Classification Search
CPC ........... G03G 15/1615; G03G 15/1612; G03G 15/162; G03G 15/2057
See application file for complete search history.

(56) References Cited

U.S. PATENT DOCUMENTS 9,268,273 B2 2/2016 Miyahara et al.
9,348,283 B2 5/2016 Takada et al.
(Continued)

FOREIGN PATENT DOCUMENTS

JP 2009-15137 A 1/2009
JP 2010-155443 A 7/2010
(Continued)

OTHER PUBLICATIONS

Machine Translation of JP-2010143118-A (Year: 2010).*

*Primary Examiner* — Daniel McNally
(74) *Attorney, Agent, or Firm* — Venable LLP

(57) ABSTRACT

Provided is an endless belt-shaped electrophotographic member having a superior durability. The member comprises an endless belt-shaped substrate and a surface layer, the surface layer comprising an ionizing radiation cross-linked product of a tetrafluoroethylene-perfluoroalkyl vinyl ether copolymer (PFA), the surface layer is formed by irradiation of electron beam to a resin layer, the resin layer comprising the PFA, the surface layer has a universal hardness HU at 200° C. of 18 $N/mm^2 \leq HU \leq 40$ $N/mm^2$, and when a degree of orientation of the PFA in the resin layer in a direction orthogonal to the circumferential direction of the substrate is defined as Ri, and a degree of orientation of the crosslinked PFA in the surface layer in the direction orthogonal to the circumferential direction of the substrate is defined as Rf, Ri and Rf satisfy a relationship represented by expression (1):

$$Ri \times 0.8 \leq Rf \leq Ri \quad (1).$$

10 Claims, 4 Drawing Sheets

(56) References Cited

U.S. PATENT DOCUMENTS

| | | | |
|---|---|---|---|
| 9,367,009 B2 | 6/2016 | Akiyama et al. | |
| 9,465,338 B2 | 10/2016 | Maeda et al. | |
| 9,575,449 B2 | 2/2017 | Oshima et al. | |
| 9,588,471 B2 | 3/2017 | Matsumoto et al. | |
| 9,671,731 B2 | 6/2017 | Matsunaka et al. | |
| 9,715,202 B2 | 7/2017 | Maeda et al. | |
| 2014/0107250 A1* | 4/2014 | Maeda | G03G 15/2057 522/156 |

FOREIGN PATENT DOCUMENTS

| | | |
|---|---|---|
| JP | 2010143118 A * | 7/2010 |
| JP | 2012-22110 A | 2/2012 |

* cited by examiner

ELECTROPHOTOGRAPHIC MEMBER, FIXING MEMBER, FIXING APPARATUS, IMAGE FORMING APPARATUS, AND METHOD OF PRODUCING ELECTROPHOTOGRAPHIC BELT

BACKGROUND OF THE INVENTION

Field of the Invention

The present invention relates to an electrophotographic member, a fixing member, a fixing apparatus, an image forming apparatus, and a method of producing an electrophotographic belt.

Description of the Related Art

Some electrophotographic image forming apparatuses such as printers, copiers and fax machines include a fixing apparatus using a heating method. Such a fixing apparatus includes a fixing member in the form of a film or a roller. In a known configuration of such a fixing member, the fixing member includes a substrate, and a surface layer disposed on the substrate and containing a fluorinated resin having high toner releasing properties. The substrate is formed of a material such as a heat-resistant resin or a metal. An elastic layer formed of a heat-resistant rubber is disposed between the substrate and the surface layer when necessary.

Herein, the surface layer can contain a fluorinated resin having high heat resistance such as tetrafluoroethylene-perfluoroalkyl vinyl ether copolymer (PFA).

Higher durability has recently been required for the fixing member with an increase in printing speed. Particularly, as a result of the contact between the surface layer of the fixing member and a recording material, the surface layer is readily worn by the recording material, leading to a reduction in life of the fixing member in some cases. To deal with the wear of the surface layer, an enhancement in wear resistance of a fluorinated resin layer forming the surface layer has been examined in various ways.

One known technique is addition of a non-fluorine additive (filler) in a fluorinated resin to enhance the strength of the fluorinated resin.

Japanese Patent Application Laid-Open No. 2012-22110 discloses a fluorinated resin reinforced through addition of carbon fibers to the fluorinated resin.

Japanese Patent Application Laid-Open No. 2009-15137 discloses a technique of reinforcing PFA through addition of a filler containing fluorine similar to PFA, specifically a technique of reinforcing PFA through preparation of a composite material of the PFA and poly(tetrafluoroethylene) (PTFE).

Japanese Patent Application Laid-Open No. 2010-155443 discloses a fluorinated resin reinforced by calcinating a dispersion or powder of a fluorinated resin such as PFA and PTFE at a temperature equal to or higher than the melting point of the fluorinated resin, and then crosslinking the fluorinated resin through irradiation with electron beams at a temperature equal to or lower than the melting point of the fluorinated resin.

Use of these reinforcing methods can provide fluorinated resin materials for a surface layer having higher wear resistance than that of those prepared by conventional techniques, and thus can enhance the durability of the fixing member.

However, a study by the present inventors reveals that the conventional techniques still have the following problems.

In Japanese Patent Application Laid-Open No. 2012-22110, the intrinsic chemical stability of the fluorinated resin may be impaired because carbon fibers having large surface energy are added to the fluorinated resin. Such a resin material having impaired intrinsic chemical stability often causes off-setting and separation failure during the fixing of toner images by a fixing member including a surface layer formed of the resin material.

In Japanese Patent Application Laid-Open No. 2009-15137, the filler does not impair the intrinsic chemical stability of the fluorinated resin because the filler is an additive containing fluorine similar to the PFA; however, a weak bond between the PFA and the PTFE may readily cause breakage such as crack of the surface layer or peel-off of the filler in some cases, and reduce the durability of the surface layer in some cases although its wear resistance is enhanced.

As disclosed in Japanese Patent Application Laid-Open No. 2010-155443, if a layer of a dispersion or powder of the fluorinated resin formed on the substrate or an elastic layer when necessary is calcinated at a temperature equal to or higher than the melting point of the fluorinated resin, the substrate or the elastic layer to be used should have heat resistance at high temperature. Accordingly, the technique disclosed in Japanese Patent Application Laid-Open No. 2010-155443 can be used only on such limited conditions.

One aspect of the present invention is directed to providing an electrophotographic member having a superior durability.

Another aspect of the present invention is directed to providing a fixing apparatus capable of providing an electrophotographic image with high quality.

Further aspect of the present invention is directed to providing a method of producing an electrophotographic belt having a superior durability.

SUMMARY OF THE INVENTION

According to one aspect of the present invention, there is provided an endless belt-shaped electrophotographic member comprising an endless belt-shaped substrate and a surface layer on the outer peripheral surface of the substrate, wherein the surface layer comprises an ionizing radiation crosslinked product of a tetrafluoroethylene-perfluoroalkyl vinyl ether copolymer, the surface layer is formed by irradiation of electron beam to a resin layer provided on the substrate, the resin layer comprising the tetrafluoroethylene-perfluoroalkyl vinyl ether copolymer, the surface layer has a universal hardness HU at 200° C. of 18 $N/mm^2 \leq HU \leq 40\ N/mm^2$, and when

- a degree of orientation of the tetrafluoroethylene-perfluoroalkyl vinyl ether copolymer in the resin layer in a direction orthogonal to the circumferential direction of the substrate is defined as Ri, and
- a degree of orientation of the crosslinked product of the tetrafluoroethylene-perfluoroalkyl vinyl ether copolymer in the surface layer in the direction orthogonal to the circumferential direction of the substrate is defined as Rf, Ri and Rf satisfy a relationship represented by expression (1):

$$Ri \times 0.8 \leq Rf \leq Ri \tag{1}$$

wherein Ri is represented by expression (2):

$$Ri = AR0/AR90 \tag{2}$$

wherein when in polarized spectrum in the direction orthogonal to the circumferential direction of the substrate in an infrared-spectroscopic measurement of the resin layer, an absorption peak value at 640 $cm^{-1}$ is defined as Abs640r0 and an absorption peak value at 993 $cm^{-1}$ is defined as Abs993r0, AR0 is represented by expression (3):

$$AR0=Abs640r0/Abs993r0 \quad (3)$$

and when in polarized spectrum in the circumferential direction of the substrate in an infrared-spectroscopic measurement of the resin layer, an absorption peak value at 640 $cm^{-1}$ is defined as Abs640r90 and an absorption peak value at 993 $cm^{-1}$ is defined as Abs993r90, AR90 is represented by expression (4):

$$AR90=Abs640r90/Abs993r90 \quad (4)$$

and Rf is represented by expression (5):

$$Rf=AS0/AS90 \quad (5)$$

wherein when in polarized spectrum in the direction orthogonal to the circumferential direction of the substrate in an infrared-spectroscopic measurement of the surface layer, an absorption peak value at 640 $cm^{-1}$ is defined as Abs640s0 and an absorption peak value at 993 $cm^{-1}$ is defined as Abs993s0, AS0 is represented by expression (6):

$$AS0=Abs640s0/Abs993s0 \quad (6),$$

and when in polarized spectrum in the circumferential direction of the substrate in an infrared-spectroscopic measurement of the surface layer, an absorption peak value at 640 $cm^{-1}$ is defined as Abs640s90 and an absorption peak value at 993 $cm^{-1}$ is defined as Abs993s90, AS90 is represented by expression (7):

$$AS90=Abs640s90/Abs993s90 \quad (7).$$

According to another aspect of the present invention, there is provided a fixing apparatus for heat fixing a toner image, comprising a pressurizing member and a fixing member, the fixing member disposed facing the pressurizing member, wherein the fixing member is the aforementioned electrophotographic member.

According to further another aspect of the present invention, there is provided a method of producing an electrophotographic belt comprising an endless belt-shaped substrate, and a surface layer covering an outer peripheral surface of the substrate, the method comprising:

(i) providing an extruded cylindrical product of a resin material comprising a tetrafluoroethylene-perfluoroalkyl vinyl ether copolymer, (ii) covering the outer peripheral surface of the substrate with the extruded cylindrical product, and (iii) forming a surface layer through crosslinking of the tetrafluoroethylene-perfluoroalkyl vinyl ether copolymer in the extruded cylindrical product through irradiation of an outer surface of the extruded cylindrical product with ionizing radiation in a state where the extruded cylindrical product covering the outer peripheral surface of the substrate is heated to a temperature equal to or higher than a glass transition temperature (Tg) of the tetrafluoroethylene-perfluoroalkyl vinyl ether copolymer and lower than a melting point (Tm) of the tetrafluoroethylene-perfluoroalkyl vinyl ether copolymer, wherein the surface layer has a universal hardness HU at 200° C. of 18 $N/mm^2 \le HU \le 40$ $N/mm^2$, and when a degree of orientation of the tetrafluoroethylene-perfluoroalkyl vinyl ether copolymer in the extruded cylindrical product in a direction orthogonal to the circumferential direction of the substrate is defined as Ri, and a degree of orientation of a crosslinked product of the tetrafluoroethylene-perfluoroalkyl vinyl ether copolymer in the surface layer formed in the step (iii), in the direction orthogonal to the circumferential direction of the substrate is defined as Rf, Ri and Rf satisfy a relationship represented by expression (1):

$$Ri \times 0.8 \le Rf \le Ri \quad (1)$$

wherein Ri is represented by expression (2):

$$Ri=AR0/AR90 \quad (2)$$

wherein when in polarized spectrum in the direction orthogonal to the circumferential direction of the substrate in an infrared-spectroscopic measurement of the extruded cylindrical product, an absorption peak value at 640 $cm^{-1}$ is defined as Abs640r0 and an absorption peak value at 993 $cm^{-1}$ is defined as Abs993r0, AR0 is represented by expression (3):

$$AR0=Abs640r0/Abs993r0 \quad (3)$$

and when in polarized spectrum in the circumferential direction of the substrate in an infrared-spectroscopic measurement of the extruded cylindrical product, an absorption peak value at 640 $cm^{-1}$ is defined as Abs640r90 and an absorption peak value at 993 $cm^{-1}$ is defined as Abs993r90, AR90 is represented by expression (4):

$$AR90=Abs640r90/Abs993r90 \quad (4)$$

and Rf is represented by expression (5):

$$Rf=AS0/AS90 \quad (5)$$

wherein when in polarized spectrum in the direction orthogonal to the circumferential direction of the substrate in an infrared-spectroscopic measurement of the surface layer, an absorption peak value at 640 $cm^{-1}$ is defined as Abs640s0 and an absorption peak value at 993 $cm^{-1}$ is defined as Abs993s0, AS0 is represented by expression (6):

$$AS0=Abs640s0/Abs993s0 \quad (6)$$

and when in polarized spectrum in the circumferential direction of the substrate in an infrared-spectroscopic measurement of the surface layer, an absorption peak value at 640 $cm^{-1}$ is defined as Abs640s90 and an absorption peak value at 993 $cm^{-1}$ is defined as Abs993s90, AS90 is represented by expression (7):

$$AS90=Abs640s90/Abs993s90 \quad (7).$$

Further features of the present invention will become apparent from the following description of exemplary embodiments with reference to the attached drawings.

DESCRIPTION OF THE EMBODIMENTS

Figure 1:
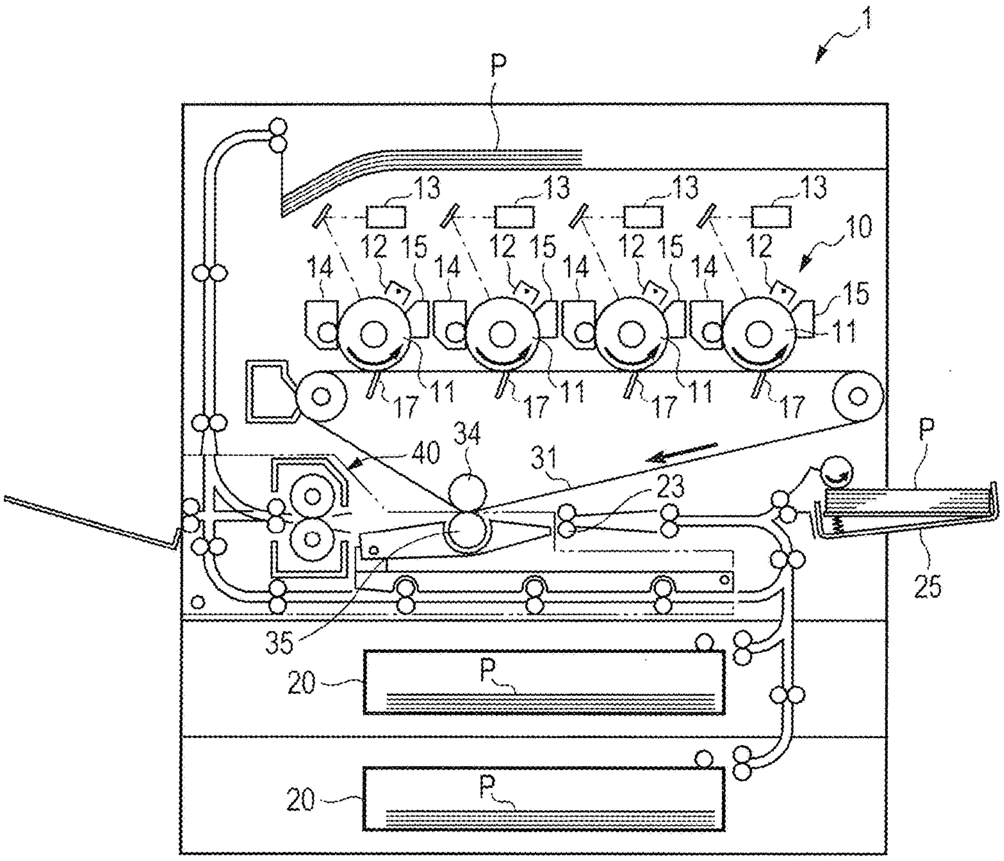
FIG. 1 is a schematic cross-sectional view of one example of the image forming apparatus according to the present invention.

Preferred embodiments of the present invention will now be described in detail in accordance with the accompanying drawings.

The endless belt-shaped electrophotographic member according to one aspect of the present invention includes an endless belt-shaped substrate and a surface layer on the outer peripheral surface of the substrate.

The surface layer contains a crosslinked product as a result of irradiation of a tetrafluoroethylene-perfluoroalkyl vinyl ether copolymer (hereinafter, referred to as "PFA") with ionizing radiation, i.e., an ionizing radiation crosslinked product.

The surface layer is formed by irradiation of electron beam to a resin layer provided on the substrate, the resin layer comprising the PFA.

In addition, the surface layer has a universal hardness HU at 200° C. of 18 $N/mm^2 \leq HU \leq 40$ $N/mm^2$.

Furthermore, when a degree of orientation of the PFA in the resin layer in a direction orthogonal to the circumferential direction of the substrate is defined as Ri, and a degree of orientation of the PFA in the surface layer in the direction orthogonal to the circumferential direction of the substrate is defined as Rf, Ri and Rf satisfy a relationship represented by expression (1):

$$Ri \times 0.8 \leq Rf \leq Ri \quad (1).$$

In the expression (1), Ri is represented by expression (2):

$$Ri = AR0/AR90 \quad (2).$$

When in polarized spectrum in the direction orthogonal to the circumferential direction of the substrate in an infrared-spectroscopic measurement of the resin layer, an absorption peak value at 640 $cm^{-1}$ is defined as Abs640r0 and an absorption peak value at 993 $cm^{-1}$ is defined as Abs993r0, AR0 in the expression (2) is represented by expression (3):

$$AR0 = Abs640r0/Abs993r0 \quad (3).$$

When in polarized spectrum in the circumferential direction of the substrate in an infrared-spectroscopic measurement of the resin layer, an absorption peak value at 640 $cm^{-1}$ is defined as Abs640r90 and an absorption peak value at 993 $cm^{-1}$ is defined as Abs993r90, AR90 in the expression (2) is represented by expression (4):

$$AR90 = Abs640r90/Abs993r90 \quad (4).$$

In addition, in the expression (1), Rf is represented by expression (5):

$$Rf = AS0/AS90 \quad (5).$$

When in polarized spectrum in the direction orthogonal to the circumferential direction of the substrate in an infrared-spectroscopic measurement of the surface layer, an absorption peak value at 640 $cm^{-1}$ is defined as Abs640s0 and an absorption peak value at 993 $cm^{-1}$ is defined as Abs993s0, AS0 in the expression (5) is represented by expression (6):

$$AS0 = Abs640s0/Abs993s0 \quad (6).$$

When in polarized spectrum in the circumferential direction of the substrate in an infrared-spectroscopic measurement of the surface layer, an absorption peak value at 640 $cm^{-1}$ is defined as Abs640s90 and an absorption peak value at 993 $cm^{-1}$ is defined as Abs993s90, AS90 in the expression (5) is represented by expression (7):

$$AS90 = Abs640s90/Abs993s90 \quad (7).$$

In the infrared absorption spectrum, an absorption peak attributing to the bending vibration of $CF_2$ bond constituting main chain of the PFA is observed at 640 $cm^{-1}$.

In addition, an absorption peak attributing to the structure of the side chain moiety of the PFA (for example, $—OCF_2CF_2CF_3$) is observed at 993 $cm^{-1}$. Herein, because the absorption peak at 640 $cm^{-1}$ attributes to the main chain of the PFA molecule, the intensity of the peak vary depending on the orientation of the PFA molecule. In contrast, because the absorption peak at 993 $cm^{-1}$ attributes to the side chain moiety of the PFA molecule, the intensity of the peak is not affected by the orientation of the PFA molecule.

Accordingly, a degree of orientation of the PFA molecule in a film in which the PFA molecule orients can be determined as follows.

A value obtained by dividing the absorption intensity at 640 $cm^{-1}$ by the absorption intensity at 993 $cm^{-1}$ is first defined as A0 where the absorption intensities at 640 $cm^{-1}$ and 993 $cm^{-1}$ are measured by aligning the direction of the infrared light with the direction of the orientation of the PFA molecule.

In the next, a value obtained by dividing the absorption intensity at 640 $cm^{-1}$ by the absorption intensity at 993 $cm^{-1}$ is first defined as A90 where the absorption intensities at 640 $cm^{-1}$ and 993 $cm^{-1}$ are measured by aligning the direction of the infrared light with the direction orthogonal to the direction of the orientation of the PFA molecule.

A value obtained by dividing the A0 by the A90, namely A0/A90 corresponds to the degree of orientation of the PFA molecule in the film.

The relationship between Ri and Rf according to the expression (1) represents that the orientation of the PFA molecule in the resin layer before the crosslinking the PFA by ionizing radiation such as electron beam, is retained in the surface layer containing crosslinked PFA by ionizing radiation.

The Ri is preferably 1.5 or more and 2.5 or less with respect to the mechanical strength of the resin layer and the surface layer formed by the irradiation of ionizing radiation to the resin layer.

An electrophotographic member provided with the surface layer with such a physical property has a surface layer having high durability to prevent chipping or breakage of the surface layer even after long time use. Furthermore, such a surface layer can enhance the followability of the surface layer to the recording material to reduce the generation of uneven gloss of fixed images.

The surface layer may be disposed directly on the substrate to contact the substrate, or one or more different layers such as an elastic layer may be disposed between the substrate and the surface layer.

Examples of a form of the electrophotographic member include an electrophotographic belt, which is an electrophotographic member in the shape of an endless belt. The outer surface of the surface layer of the electrophotographic belt corresponds to the outer peripheral surface of the electrophotographic member.

The method of producing an electrophotographic belt according to the present aspect includes the following steps: (A) providing an extruded cylindrical product of a resin material including PFA;

(B) covering the outer peripheral surface of an endless belt-shaped substrate with an extruded cylindrical product; and (C) forming a surface layer through crosslinking of the PFA in the extruded cylindrical product through irradiation of an outer surface of the extruded cylindrical product with ionizing radiation in a state where the extruded cylindrical product covering the substrate is heated to a temperature equal to or higher than a glass transition temperature (Tg) of the PFA and lower than a melting point (Tm) of the PFA.

When a degree of orientation of the tetrafluoroethylene-perfluoroalkyl vinyl ether copolymer in the extruded cylindrical product in a direction orthogonal to the circumferential direction of the substrate is defined as Ri, and a degree of orientation of the crosslinked product of the tetrafluoroethylene-perfluoroalkyl vinyl ether copolymer in the surface layer in the direction orthogonal to the circumferential direction of the substrate is defined as Rf, Ri and Rf satisfy a relationship represented by expression (1):

$$Ri \times 0.8 \leq Rf \leq Ri \quad (1).$$

In the expression (1), Ri is represented by expression (2):

$$Ri = AR0/AR90 \quad (2).$$

When in polarized spectrum in the direction orthogonal to the circumferential direction of the substrate in an infrared-spectroscopic measurement of the extruded cylindrical product, an absorption peak value at 640 $cm^{-1}$ is defined as Abs640r0 and an absorption peak value at 993 $cm^{-1}$ is defined as Abs993r0, AR0 is represented by expression (3):

$$AR0 = Abs640r0/Abs993r0 \quad (3).$$

When in polarized spectrum in the circumferential direction of the substrate in an infrared-spectroscopic measurement of the extruded cylindrical product, an absorption peak value at 640 $cm^{-1}$ is defined as Abs640r90 and an absorption peak value at 993 $cm^{-1}$ is defined as Abs993r90, AR90 is represented by expression (4):

$$AR90 = Abs640r90/Abs993r90 \quad (4).$$

In addition, Rf in the expression (1) is represented by expression (5):

$$Rf = AS0/AS90 \quad (5).$$

When in polarized spectrum in the direction orthogonal to the circumferential direction of the substrate in an infrared-spectroscopic measurement of the surface layer, an absorption peak value at 640 $cm^{-1}$ is defined as Abs640s0 and an absorption peak value at 993 $cm^{-1}$ is defined as Abs993s0, AS0 is represented by expression (6):

$$AS0 = Abs640s0/Abs993s0 \quad (6).$$

When in polarized spectrum in the circumferential direction of the substrate in an infrared-spectroscopic measurement of the surface layer, an absorption peak value at 640 $cm^{-1}$ is defined as Abs640s90 and an absorption peak value at 993 $cm^{-1}$ is defined as Abs993s90, AS90 is represented by expression (7):

$$AS90 = Abs640s90/Abs993s90 \quad (7).$$

In step (B), the outer peripheral surface of the substrate is covered with the extruded cylindrical product such that the transverse direction of the endless belt-like substrate matches with the extrusion direction of the extruded cylindrical product.

A step of disposing an elastic layer on the outer peripheral surface of the substrate, and covering the elastic layer with the extruded cylindrical product may be added, when necessary, before covering of the extruded cylindrical product.

The resin component in the resin material including PFA includes a crosslinkable PFA. The resin material can contain a variety of additives besides the resin component. Any resin material including PFA can be used as long as the target electrophotographic member of the present invention can be obtained. A resin material for use can be selected from commercially available PFA-containing materials or known PFA-containing materials.

The substrate can be formed of a material selected according to the mechanical strength and the handling properties in use as the fixing member. A metal material can be used as the material for a substrate.

The electrophotographic member according to the present invention can be used as a fixing member for heat fixing toner images. In use as the fixing member, the surface layer functions as a fixing surface layer. This fixing member can be used as a component for a toner image fixing apparatus and an image forming apparatus including the toner image fixing apparatus. The fixing apparatus and the image forming apparatus can be produced using an electrophotographic member including a surface layer containing a crosslinking PFA as a fixing member to demonstrate a heat fixing function with high durability.

An embodiment according to the present invention will now be described with reference to the drawings.

FIG. 1 is a schematic cross-sectional view taken along the transportation direction of a sheet of printing paper as a recording material and illustrating a configuration of a color electrophotographic printer, which is an image forming apparatus in which one embodiment of the fixing apparatus according to the present invention is installed.

The color electrophotographic printer is simply referred to as "printer" in the present embodiment.

A printer 1 illustrated in FIG. 1 includes image forming units 10 of colors yellow (Y), magenta (M), cyan (C) and black (Bk). Photosensitive drum 11 as an electrophotographic photosensitive member is preliminarily charged by a charger 12. Subsequently, a latent image is formed on the photosensitive drum 11 by a laser scanner 13. The latent image is formed into a toner image by a developing unit 14. The toner images on the photosensitive drum 11 are sequentially transferred onto an intermediate transfer belt 31 as an image carrier, for example, by a primary transfer blade 17. After transfer, the residual toners on the photosensitive drum 11 are removed by a cleaner 15. As a result, the surface of the photosensitive drum 11 is cleaned to prepare for the next image formation process.

Sheets of printing paper P are fed from a sheet feeding cassette 20 or a multi-sheet feed tray 25 to a pair of registration rollers 23 one by one. The pair of registration rollers 23 once receives the printing paper P, and aligns the printing paper P straight if the printing paper P is inclined. The pair of registration rollers 23 feeds the printing paper P between the endless intermediate transfer belt 31 and a secondary transfer roller 35 in synchronization with the toner image on the intermediate transfer belt 31. The toner images of the colors on the intermediate transfer belt 31 are transferred onto the printing paper P by a transfer member such as the secondary transfer roller 35. Subsequently, the toner images transferred onto the printing paper P are fixed on the printing paper P by heating and pressing the printing paper P with a fixing apparatus 40. A transfer unit includes a roller 34, the intermediate transfer belt 31 and the secondary transfer roller 35. The toner images on the transfer belt are transferred onto the printing paper P by passing the transfer belt 31 and the printing paper P through the nip defined by the roller 34 and the secondary transfer roller 35.

The fixing apparatus according to the present embodiment will now be described.

Figure 2:
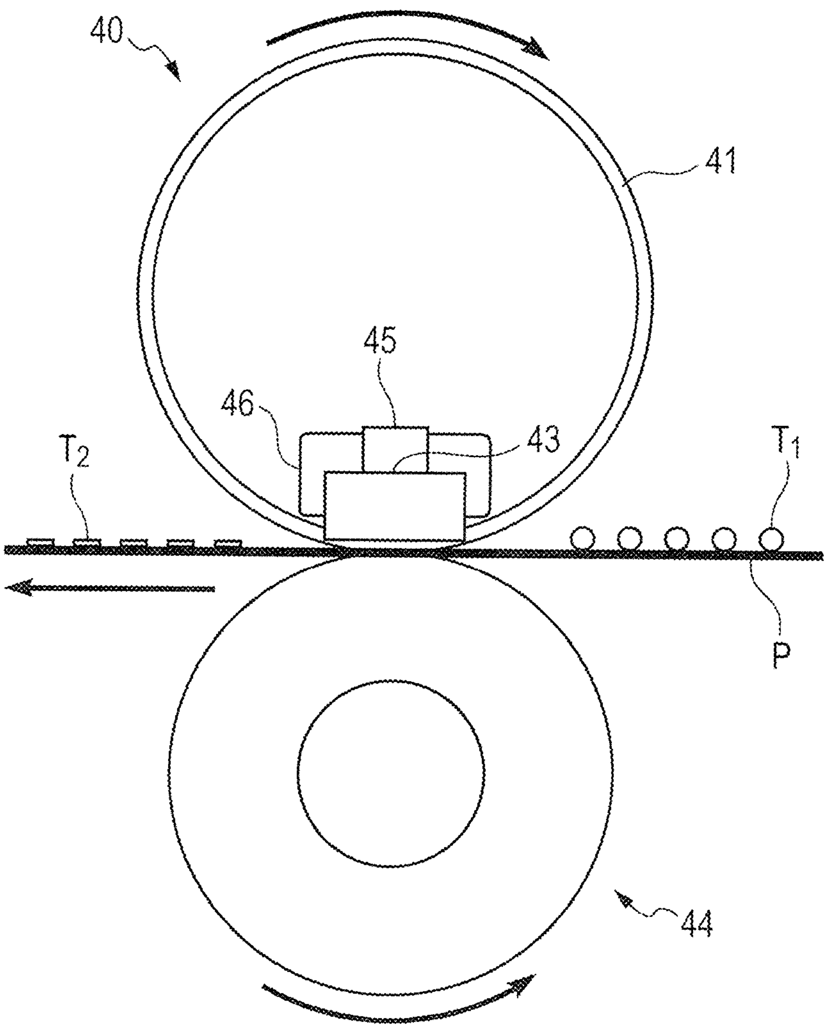
FIG. 2 is a schematic cross-sectional view of one example of the fixing apparatus according to the present invention.

FIG. 2 is a schematic cross-sectional view of a fixing apparatus 40. This fixing apparatus is a film-heating fixing apparatus (tension-less type).

The fixing apparatus illustrated herein includes a fixing member 41, a heater 43, a pressurizing roller 44, a contact thermistor 45 and a heater holder 46. Among these members, the fixing member 41, the heater 43 and the pressurizing roller 44 are essential members.

A variety of heaters can be used as the heater 43; the heater 43 used in the present embodiment is a ceramic heater (hereinafter, referred to as heater).

The basic configuration of the heater 43 includes a ceramic substrate in the form of a thin and long plate whose longitudinal direction is along the direction vertical to the drawing, and an energization heating resistor layer disposed on the surface of the substrate. The heater 43 is a low heat capacity heater that sharply and rapidly raises the entire temperature through energization of the heating resistor layer. The heater is configured to change the energization region according to the longitudinal width of the printing paper.

The fixing member 41 includes an endless cylindrical (endless shape) rotating body, and has heat resistance as a heat fixing member which conducts heat. The fixing member 41 is loosely and externally fitted to a support member including the heater 43.

In the present embodiment, the fixing member 41 used is an electrophotographic belt as one form of the electrophotographic member according to the present invention. The electrophotographic belt according to the present embodiment has a structure illustrated in FIG. 3A or FIG. 3B. The electrophotographic belt illustrated in FIG. 3A has a two-layer composite structure in which the outer peripheral surface of a cylindrical substrate 41*b* is coated with a surface layer 41*a* while the electrophotographic belt illustrated in FIG. 3B has a three-layer composite structure including the two layers illustrated in the structure of FIG. 3A and an additional elastic layer 41*c*.

The surface layer 41*a* can have any thickness which can attain the intended fixing function. The thickness can be selected from the range of 100 μm or less, preferably 10 μm to 70 μm.

To enhance the quick starting properties as in the surface layer, the substrate 41*b* can also be formed of a heat-resistant material having a thickness of 100 μm or less, preferably 20 μm or more and 50 μm or less, and having high thermal conductivity. The material for a substrate used can be a metal film made of a metal material such as stainless steel (SUS) or nickel, for example.

The elastic layer 41*c* can be formed of a rubber material having a thickness of 1000 μm or less, preferably 500 μm or less to reduce the heat capacity to enhance the quick starting properties. Examples thereof include a silicone rubber and a fluoro rubber.

The pressurizing roller 44 has heat resistance and elasticity as a pressurizing member. The pressurizing roller 44 can include a mandrel, and an elastic layer formed of a heat-resistant rubber such as a silicone rubber and a fluoro rubber, or a foamed body of a silicone rubber. The pressurizing roller 44 is disposed within the heat fixing apparatus in a state where both ends of the mandrel are rotatably supported by bearings. The fixing member 41 and the heater 43 are disposed above the pressurizing roller 44 so as to be parallel to the longitudinal direction of the pressurizing roller 44.

The pressurizing roller 44 is pressed against the heater 43 by a pressing member not illustrated to press the bottom surface of the heater 43 to abut against the top surface of the pressurizing roller 44 via the fixing member 41 against the elasticity of the elastic layer included in the pressurizing roller 44, thereby forming a fixing nip having a predetermined width as a heating portion.

The pressurizing roller 44 is rotatably driven in the counterclockwise direction indicated by the arrow at a predetermined rotational circumferential speed by a driving unit not illustrated. The pressure contact frictional force generated in the fixing nip between the pressurizing roller 44 and the fixing member 41 by the rotational driving of the pressurizing roller 44 generates a rotational force acting on the fixing member 41. As a result, the fixing member 41 is followingly rotated in the clockwise direction indicated by the arrow while the fixing member 41 tightly contacts and slides on the bottom surface of the heater 43. The support member including the heater 43 is also a rotation guide member for the fixing member 41.

The pressurizing roller 44 is rotatably driven. With this rotation, the fixing member 41 is followingly rotated in the arrow direction. The heater 43 is electrically conducted to rapidly increase the temperature of the heater 43 to a predetermined temperature. As a result, the heater is activated to have a controlled temperature. In this controlled state of the temperature, printing paper P having an unfixed toner image $T_1$ is introduced into the fixing nip between the fixing member 41 and the pressurizing roller 44. Inside the fixing nip, the toner image carrying surface of the printing paper P is tightly contacted with the outer surface of the fixing member 41, and is carried on and transported with the fixing member 41 through the fixing nip. In this carrying and transportation process, the printing paper P is heated by the heat of the fixing member 41 heated by the heater 43 to heat and pressurize the unfixed toner image $T_1$ on the printing paper P, which is thereby melted, and is fixed onto the printing paper P to form a fixed toner image $T_2$. The printing paper P passed through the fixing nip self-strips from the surface of the fixing member 41, and is transported, and is discharged.

The temperature of the fixing member 41 heated by the heater 43 is measured by the thermistor (contact thermometer), and the result of measurement is transmitted to a temperature control unit not illustrated. The heater holder 46 holds the heater 43 heated to a high temperature.

The items about the durability of the surface layer of the fixing member 41 will be described below.

[Description of Mechanism of Chipping of Surface Layer by Edge of Printing Paper]

The mechanism to chip the surface layer of the fixing member by the end of a sheet of the printing paper during transportation of the printing paper to the fixing apparatus will be described with reference to FIG. 4.

Figure 4:
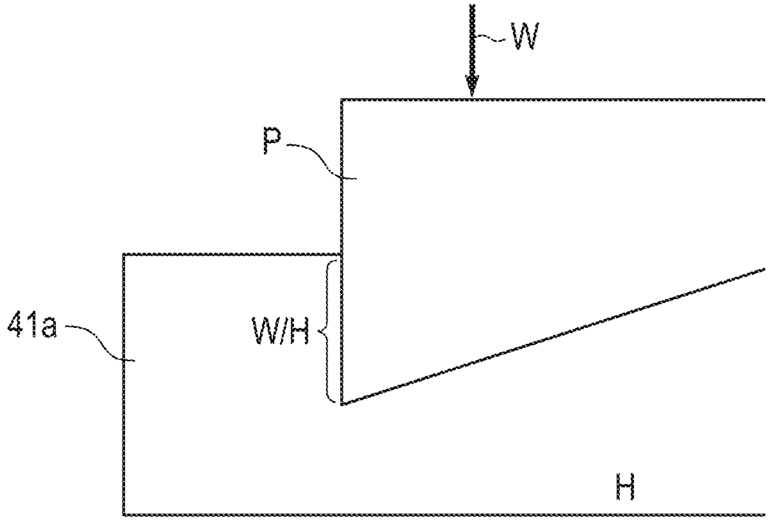
FIG. 4 is a schematic plan view illustrating the contact portion between the warp formed by cutting at an end of printing paper and the surface layer of the fixing member.

FIG. 4 is a schematic plan view of a contact portion between the warp formed by cutting at the end of the printing paper P (hereinafter, referred to as paper burr) and the surface layer 41*a* of the fixing member 41, which forms the nip with the pressurizing roller 44. In FIG. 4, the pressurizing roller 44 is not illustrated. The printing paper P is produced by cutting large-sized paper into a desired size by a cutter. During this cutting process, the paper burr is generated at the edges of the printing paper P. The edge of the printing paper P is forced into the surface layer 41*a* under a load W to deform the surface of the surface layer 41*a*. The deformed portion of the surface of the surface layer 41*a* is chipped. Namely, wear occurs at a paper burr portion (hereinafter, referred to as scratch).

The rate at which one sliding component to be worn is chipped because of wear between the one sliding component and another sliding component is represented by expression (A):

$$\Delta V = K \cdot L \cdot (W/H) \quad \text{(A)}$$

ΔV: wear volume
K: coefficient
L: wear distance
W: load
H: hardness

Usually, the surface layer has a hardness lower than that of the printing paper; thus, the surface layer 41*a* having a lower hardness deforms under application of a pressing load W. The amount of deformation is determined by the hardness of the surface layer 41*a*. The amount of deformation is W/H where the hardness of the surface layer 41*a* is H, and the pressing load by the printing paper is W.

If such a deformed surface layer 41*a* is worn by a wear distance L by the printing paper, the volume removed by the wear of the surface layer is represented by the product of the amount of deformation and the wear distance. As a result, the relationship represented by expression (A) is obtained; the wear volume ΔV is proportional to the wear distance and the load, and inversely proportional to the hardness.

The wear volume ΔV is represented by expression (B):

$$\Delta V = \Delta x \cdot \Delta y \cdot \Delta z \quad \text{(B)}$$

ΔV: wear volume
Δx: wear width
Δy: wear length
Δz: wear depth

Examples of failures generated by the wear of the surface layer include off-setting generated by the toner invaded into a wear-scratched portion. The wear depth Δz significantly affects this generation of off-setting. The wear depth Δz per unit width and unit length is often treated using expression (C), and is compared to the actual off-setting level:

$$\Delta z = K \cdot L \cdot (W/H) \quad \text{(C)}$$

Δz: wear depth
K: coefficient
L: wear distance
W: load
H: hardness

Accordingly, the value of Δz should be reduced to prevent off-setting and prolong the life of the fixing member.

[Description of Mechanism of Break in Surface Layer by Edge of Printing Paper]

The mechanism to break the surface layer of the fixing member during continuous transportation of sheets of printing paper to the fixing apparatus will now be described with reference to FIG. 5.

Figure 5:
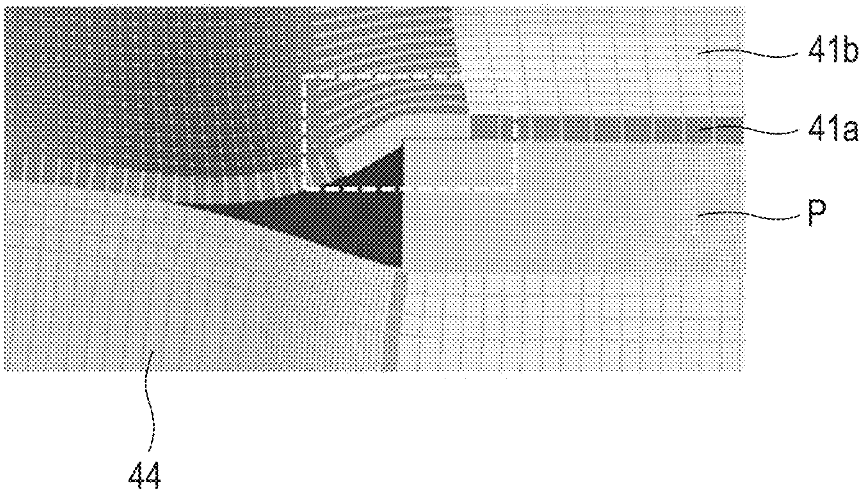
FIG. 5 is a schematic view illustrating a state of a deformed fixing nip defined by the fixing member and the pressurizing roller when printing paper is transported to the fixing nip.

FIG. 5 is a schematic cross-sectional view illustrating the state of deformation when the printing paper P is transported into the fixing nip defined by the fixing member 41 and the pressurizing roller 44.

It is found that the printing paper P invades into the portion surrounded by dotted lines in FIG. 5 to deform the surface layer 41*a*, and thus apply stress in the tensile direction to the surface layer. If the yield stress of the surface layer 41*a* is sufficiently large relative to the tensile deformation generated at this time, no plastic deformation generates. For this reason, the surface layer 41*a* is unlikely to break. If the yield stress of the surface layer is small relative to the generated tensile deformation, plastic deformation is generated by the printing paper P transported, and the accumulated plastic deformation results in breakage of the surface layer 41*a* of the fixing member.

The present inventors, who have conducted a study, have verified that the yield stress has a strong correlation with the breakage life, and concluded that the yield stress and breakage of the fixing surface layer have a highly strong relationship.

The material used for forming the surface layer in the present invention is a resin material containing PFA as a resin component. The surface layer is formed by crosslinking through irradiation of the extruded product of the resin material with ionizing radiation under a specific condition.

The method of producing an electrophotographic belt according to the present embodiment will now be described.

[Method of Preparing Surface Layer Including Irradiation with Ionizing Radiation]

The method according to the present embodiment includes the following steps (i) and (ii):

(i) A first step of covering the outer peripheral surface of an endless belt-shaped substrate with a PFA tube, which is an extruded cylindrical product molded into a cylindrical shape by extrusion; and (ii) A second step of irradiating the outer surface of the PFA tube, which covers the outer peripheral surface of the substrate, with ionizing radiation in a state where the workpiece is heated to a temperature equal to or higher than the glass transition temperature (Tg) of the PFA and lower than the melting point (Tm), preferably 40° C. lower than the melting point (Tm) (Tm−40° C.). In the first step, the outer peripheral surface of the substrate is covered with the extruded cylindrical product such that the extrusion direction of the PFA tube matches with the direction orthogonal to the circumferential direction of the substrate.

The irradiation with ionizing radiation in the second step results in formation of a partial structure in the PFA of the PFA tube, the partial structure being represented by structural formula (1):

Structural formula (1)

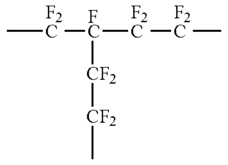

As represented in structural formula (2), the uncrosslinked PFA has a linear main chain, and has only one branched structure in the side chain moiety represented by —O—$R^1$ wherein $R^1$ represents a perfluoroalkyl group; and in structural formula (2), $R^1$ is a perfluoropropyl group:

Structural formula (2)

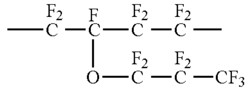

As described above, the uncrosslinked PFA heated to a temperature near the melting point is irradiated with ionizing radiation; then, the chains of PFA are cut to cause crosslinking, thereby newly forming a crosslinked structure having a branched structure represented by structural formula (1).

In this newly formed partial structure represented by structural formula (1), the fluorine atom bonded to the carbon atom next to the tertiary carbon atom has a peak near −103 ppm in the 19F-NMR spectrum. Accordingly, the presence of the partial structure represented by structural formula (1) in the PFA can be confirmed by the occurrence of the new peak (crosslinking point peak) near −103 ppm in the $^{19}$F-NMR spectrum, and thus the presence/absence of the crosslinked structure can be verified. The peak value is determined at a temperature of 250° C. using hexafluorobenzene as an external reference standard substance.

The conditions for the PFA resin material, the extrusion method, and the irradiation with ionizing radiation can be set so as to provide a surface layer which satisfies the physical properties (1) and (2) described above. As a result, the durability of the surface layer can be enhanced to prevent the chipping and breakage of the surface layer. Furthermore, the followability of the surface layer during pressing thereof onto the recording material can be enhanced to reduce the generation of uneven gloss of fixed images.

The respective steps will now be described in detail.

(First Step)

A PFA tube is first provided. The PFA tube can be prepared by extrusion of a PFA resin material including PFA as a resin component into a cylindrical shape.

Any method of extruding a PFA resin material can be used as long as a PFA tube having the target physical properties and shape can be achieved.

Herein, the PFA, which is a fluorinated resin used as a main material for a surface layer in the present invention, has a heat resistance equal to that of polytetrafluoroethylene (PTFE) and a melt viscosity lower than that of PTFE. For this reason, the PFA has high processability and smoothness.

In the next, the outer peripheral surface of a cylindrical substrate is covered with an uncrosslinked PFA tube prepared through extrusion. At this operation, the substrate is covered with the extruded cylindrical product such that the extrusion direction of the PFA tube matches with the direction orthogonal to the circumferential direction of the substrate. Any method of covering the outer peripheral surface of a substrate with a PFA tube can be used as long as the target covering state can be achieved.

In addition, regarding the PFA tube, the degree of orientation Ri of the PFA molecule to the extrusion direction is preferably 1.5 or more and 2.5 or less.

(Second Step)

Although the melting point (Tm) of the PFA somewhat changes according to the polymerization ratio of perfluoroalkyl vinyl ether, and the degree of polymerization of the PFA, the melting point (Tm) of the PFA is usually within the range of 300° C. to 310° C.

Many of fluorinated resins containing PFA are decomposable resins which undergo only a decomposition reaction through irradiation with ionizing radiation under normal temperature. In contrast, if these fluorinated resins are heated to a temperature near their melting points, and then are irradiated with ionizing radiation, a crosslinking reaction, rather than the decomposition reaction, occurs as the main reaction to cause the crosslinking of chains, thereby enhancing the wear resistance. This phenomenon is particularly known in PTFE.

A research by the present inventors has revealed that heating of the PFA to a temperature equal to or higher than the glass transition temperature of the PFA, rather than a temperature near the melting point, will sufficiently cause a crosslinking reaction to enhance the wear resistance. For the crosslinking of the PTFE having a rigid and almost linear molecular structure, crystals of the PTFE should be melted by heating to a temperature near the melting point, and be irradiated with ionizing radiation in such a state that the chains easily move. Unlike the PTFE, however, because the PFA has a non-crystalline flexible moiety attributed to the side chain, the non-crystalline moiety can flexibly move at a temperature equal to or higher than the glass transition temperature (Tg). For this reason, it is considered that the PFA can be crosslinked through irradiation with ionizing radiation at a temperature equal to or higher than the glass transition temperature (Tg). Accordingly, the temperature of the uncrosslinked PFA during irradiation with ionizing radiation is equal to or higher than the glass transition temperature (Tg) of the PFA in the second step described later, i. e., the step of irradiating the uncrosslinked PFA with ionizing radiation.

In contrast, the decomposition reaction of the PFA is dominant at a temperature of the uncrosslinked PFA controlled to be equal to or higher than the melting point (Tm) of the uncrosslinked PFA.

Herein, the glass transition temperature (Tg) is defined as an inflection point peak of tan δ measured at a frequency of 10 Hz and a heating rate of 5° C./min using a dynamic viscoelastometer (DMA).

Accordingly, the PFA tube covering the outer peripheral surface of the substrate is heated to a temperature equal to or higher than the glass transition temperature (Tg) of the PFA and lower than the melting point (Tm).

The temperature lower than the melting point can be a temperature equal to or lower than a temperature 40° C. lower than the melting point (Tm) (Tm−40° C.).

The outer surface of the PFA tube heated to the temperature above is irradiated with ionizing radiation to form the partial structure represented by structural formula (1) in the PFA contained in the PFA tube.

Examples of the ionizing radiation include γ-rays, electron beams, X-rays, neutron rays or high energy ions. Among these ionizing radiations, electron beams can be used from the viewpoint of the general versatility of the apparatus.

A standard exposure dose of the ionizing radiation is in the range of 1 to 1000 kGy, particularly 200 to 600 kGy. An exposure dose needed to form the crosslinked structure represented by structural formula (1) in the uncrosslinked PFA can be appropriately selected from the above range. An exposure dose set within this range can reduce a decrease in weight of the PFA caused by volatilization of the low molecular weight components generated as a result of cutting of the chains of the PFA.

The irradiation with ionizing radiation can be performed under a low oxygen atmosphere, particularly an atmosphere substantially having no oxygen. A specific atmosphere can be an atmosphere having an oxygen concentration of 1000 ppm or less. The irradiation with ionizing radiation can be performed in vacuum or under an atmosphere of an inert gas such as nitrogen or argon as long as the oxygen concentration is 1000 ppm or less. The nitrogen atmosphere can be used in view of cost.

According to the present invention, an electrophotographic member can be provided which causes no failure such as off-setting caused by addition of a filler, has high member processability, can reduce wear of the member caused by the recording material to prolong the life of the member, and can be used as a fixing member.

According to the present invention, a fixing member for heat fixing toner images including the electrophotographic member, and a fixing apparatus and an image forming apparatus including the fixing member can be provided.

EXAMPLES

The present invention will now be described in more detail by way of Examples and Comparative Examples.

Examples 1 to 3 and Comparative Examples 1 to 3

Figure 3A:
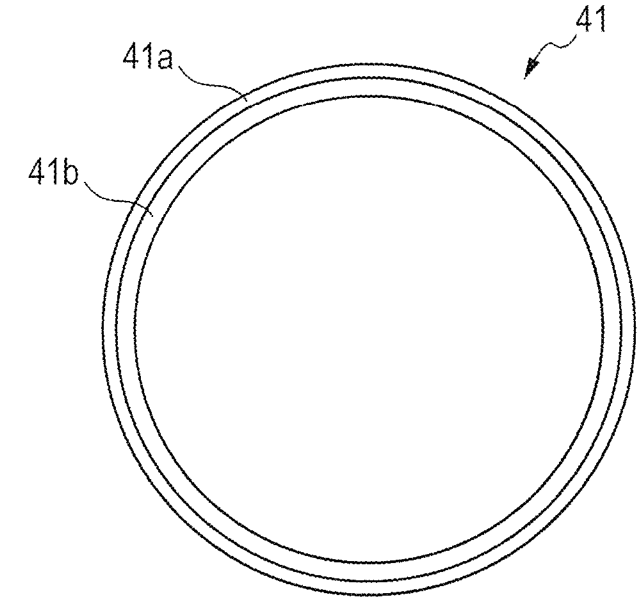
FIG. 3A and FIG. 3B are schematic cross-sectional views of examples of the fixing member according to the present invention.

A fixing member was prepared as one form of the electrophotographic belt having a structure illustrated in FIG. 3A.

(First Step)

For formation of the surface layer 41*a*, an uncrosslinked PFA tube having a thickness of 10 μm was prepared through extrusion of a PFA resin composition 350-J (manufactured by Du Pont-Mitsui Fluorochemicals Company, Ltd.; glass transition temperature (Tg): 80° C.). The substrate 41*b* used was formed of a nickel metal film having a cylindrical shape having a length of 350 mm, a thickness of 30 μm and a diameter of 25 mm.

A liquid silicone rubber mixture (trade name: SE1819CV, manufactured by Dow Corning Toray Co., Ltd.) as an adhesive was applied onto the outer peripheral surface of the substrate 41*b* using an application head having a ring shape to form an adhesive coating. The outer peripheral surface of the substrate 41*b* having the adhesive coating was covered with the uncrosslinked PFA tube for forming the surface layer 41*a*.

In this Example, the method of applying the PFA tube used was an expansion method. The expansion method is performed through the following steps:

(I) The PFA tube is vacuum suctioned from its outer peripheral surface to expand the inner diameter of the PFA tube to be larger than the outer diameter of the cylindrical substrate.

(II) In this state, the cylindrical substrate is inserted into the PFA tube.

(III) After insertion, vacuum suction is released to allow the inner diameter of the PFA tube to be reduced until the inner wall of the PFA tube is in close contact with the outer peripheral surface of the substrate having the adhesive coating for bonding of the PFA tube to the substrate.

During vacuum suction, the expansion of the PFA tube in the circumferential direction is controlled in the plastic deformation region or below. Such control can enhance the adhesion to the cylindrical substrate after vacuum suction is released.

(Second Step)

The cylindrical member prepared through the first step including the cylindrical substrate and the uncrosslinked PFA tube covering the outer peripheral surface of the substrate was placed in a heating furnace having an oxygen concentration of 1000 ppm or less. The temperature of the uncrosslinked PFA tube was controlled to a predetermined temperature of 150° C. to 320° C. (Example 1: 150° C., Example 2: 270° C.).

The outer surface of the uncrosslinked PFA tube heated to a predetermined temperature in a low oxygen atmosphere in the above treatment was irradiated with an electron beam at an exposure dose of 200 kGy to crosslink the PFA in the PFA tube, forming a surface layer. A fixing member was thereby prepared.

To verify that the partial structure represented by structural formula (1) was formed in the molecule of the PFA in the surface layer formed through the second step, part of the surface layer was cut out and the resulting piece of the surface layer was analyzed by $^{19}$F-NMR. The result of analysis revealed an appearance of a new peak near −103 ppm.

The method of evaluating the PFA resin and the results will now be described.

(Measurement of Yield Stress of PFA Resin)

Using a vertical vibration dynamic viscoelastometer Rheogel-E4000 (manufactured by UBM K.K.), the yield stress was measured from the stress-strain (S-S) curve in the tensile distortion in the molding direction (extrusion direction) of the PFA tube at 200° C. The sample extracted from the PFA tube had a thickness of 10 μm to 20 μm.

(Method of Measuring Orientation)

In this Example, polarization FT-IR measurement by a microscopic-transmission method was carried out against a PFA tube before the ionizing radiation irradiation and a surface layer obtained by the irradiation of ionizing radiation to the PFA tube.

A sample with 30 mm length, 30 mm width and 20 mm thickness that was cut out from PFA tube or surface layer was used for the measurement.

Specifically, in the measurement, polarimetry was conducted by transmission method using such as FT-IR (trade name: FTIR8900; manufactured by Shimadzu Corporation). Infrared polarizer (trade name: Grid polarizer GPR-8000; manufactured by Shimadzu Corporation) was placed between the measurement sample and the light receiving part of the FT-IR.

In the measurement of the orientation of the measurement sample obtained from the PFA tube, the measurement sample was set in the sample holder of the FT-IR in such a way that the direction orthogonal to the circumferential direction of the PFA tube was perpendicular to the direction of the polarization slit of the infrared polarizer. Then, after blank was measured with the angle of the infrared polarize set at 0 degree, transmission measurement was conducted at a resolution of 4 $cm^{-1}$ and the number of integrations of 64. In the next, after blank was measured with the angle of the infrared polarize set at 90 degree, transmission measurement was conducted under the same conditions.

Additionally, in the measurement of the orientation of the measurement sample obtained from the surface layer, the measurement sample was set in the sample holder of the FT-IR in such a way that the direction orthogonal to the circumferential direction of the surface layer was perpendicular to the direction of the polarization slit of the infrared polarizer. Then, after blank was measured with the angle of the infrared polarize set at 0 degree, transmission measurement was conducted at a resolution of 4 $cm^{-1}$ and the number of integrations of 64. In the next, after blank was measured with the angle of the infrared polarize set at 90 degree, transmission measurement was conducted under the same conditions.

(Measurement of Universal Hardness HU)

A sample (test piece of a 30 mm×30 mm square) cut out of the surface layer of the fixing member was used in the measurement of the hardness. The hardness was measured using a micro-hardness tester (trade name: HM500; manufactured by Helmut Fischer GmbH). The indenter used was of a Vickers type. The sample was placed on a stainless steel test table at a temperature of 200° C., and the hardness was measured using the S-S curve at an indentation depth of 1 μm.

[Comparison of Surface Layers in Examples 1 and 2 to Those in Comparative Examples 1 and 2]

The value of Ri of the uncrosslinked PFA tube used for preparation of the fixing member and the values of Rf of the surface layers formed in Examples 1 and 2 and Comparative Example 1 were as follows:

Uncrosslinked PFA tube: Ri=2
Surface layer in Example 1: Rf=2
Surface layer in Example 2: Rf=2
Surface layer in Comparative Example 1: Rf=1

In conclusion, the Ri values of the uncrosslinked PFA tubes used in preparation of the fixing members and the Rf values of the surface layers in Examples 1 and 2 satisfied the relationship represented by expression (1).

In the next step, the surface layers of the fixing members in Examples 1 and 2 were compared to the surface layers of the fixing members in Comparative Examples 1 and 2 for the yield stress and the hardness.

In Comparative Example 1, a fixing member was prepared in the same manner as in Example 1 except that irradiation with an electron beam was performed in a state where the PFA resin was heated at a temperature equal to or higher than the melting point (Tm: 310° C.) of the PFA resin (350-J) used in Example 1, specifically 320° C. In Comparative Example 2, a fixing member was prepared in the same manner as in Example 1 except that irradiation with an electron beam was not performed.

The conditions on the irradiation with an electron beam and the mechanical properties such as the hardness (universal hardness HU) and the yield stress in Examples 1 and 2 and Comparative Examples 1 and 2 are summarized in Table 1.

TABLE 1

| | Irradiation with electron beam | | | | | |
|---|---|---|---|---|---|---|
| | Resin type | Irradiated or not | Heating temperature | Dose | Hardness ($N/mm^2$) | Yield stress (MPa) |
| Example 1 | 350-J | Irradiated | 150° C. | 200 kGy | 25 | 7 |
| Example 2 | 350-J | Irradiated | 270° C. | 200 kGy | 25 | 7 |
| Comparative Example 1 | 350-J | Irradiated | 320° C. | 200 kGy | 15 | 3.3 |
| Comparative Example 2 | 350-J | Not irradiated | — | — | 10 | 7 |

The hardness is compared first.

The PFA irradiated with an electron beam had higher hardness than that of the PFA not irradiated with an electron beam. Analysis by $^{19}$F-NMR verified that the crosslinked moieties represented by structural formula (1) were generated in these resins, and the hardness of the surface layer was enhanced through crosslinking of the resins.

Next, the yield stress is compared.

It was verified that in the PFA irradiated with an electron beam in the temperature range of 150 to 270° C. described in Examples 1 and 2, the yield stress of the tube in the molding direction was kept substantially identical to that of the tube not irradiated with an electron beam (Comparative Example 2).

In contrast, in the PFA in the surface layer irradiated with an electron beam at a temperature equal to or higher than the melting point of the PFA (Comparative Example 1), the yield stress was lower than that of the PFA in the surface layer not irradiated with an electron beam.

Because molecules of the surface layer in the fixing member are oriented in the extrusion direction during molding, the surface layer has high mechanical strength in the extrusion direction. For this reason, the surface layer in Comparative Example 2 has high yield stress.

In Comparative Example 1 in which the surface layer was heated to a temperature equal to or higher than the melting point, the PFA contained in the surface layer was completely melted once; as a result, the orientation provided by molding was collapsed, and the resin lost its high yield stress. It is considered that the yield stress in Comparative Example 1 was lower than that of the PFA not irradiated with an electron beam for this reason.

In Examples 1 and 2, in contrast, crosslinking of the PFA was performed through irradiation with an electron beam at a temperature lower than the melting temperature of the PFA. It is considered that for this reason, the hardness was enhanced while the high yield stress of the PFA was kept.

As described above, the irradiation with an electron beam performed on the conditions described in Examples 1 and 2 enabled maintenance of the high yield stress of the PFA tube, and thus preparation of a surface layer having high hardness.

(Comparative Examination of Fixing Surface Layer for Scratch Durability and Life, and Breakage Durability and Life)

A fixing apparatus illustrated in FIG. 2 was used in this examination. In the examination, the conditions were controlled such that the total pressure was 320 N, the rotational speed of the pressurizing roller was 200 mm/s, and the outer peripheral temperature of a region of the fixing member contacting the printing paper was 150° C. The printing paper used was a sheet CS-814 (manufactured by Nippon Paper Industries Co., Ltd.). The printing paper had a paper burr of about 25 μm.

The life of the fixing surface layer was determined through comparison of the number of sheets until one of "breakage life" and "scratch life" occurred where the number of sheets printed before breakage of the fixing surface layer is referred to as "breakage life," and the number of sheets printed before generation of off-setting is referred to as "scratch life."

The results are summarized as follows.

TABLE 2

| | Irradiation with electron beam | | | | Scratch | Breakage |
|---|---|---|---|---|---|---|
| | Resin type | Irradiated or not | Heating temperature | Dose | life (1000 sheets) | life (1000 sheets) |
| Example 1 | 350-J | Irradiated | 150° C. | 200 kGy | 1000 | No breakage |
| Example 2 | 350-J | Irradiated | 270° C. | 200 kGy | 1000 | No breakage |
| Comparative Example 1 | 350-J | Irradiated | 320° C. | 200 kGy | — | 60 |
| Comparative Example 2 | 350-J | Not irradiated | — | — | 300 | No breakage |

The scratch life is compared first.

In the surface layers irradiated with an electron beam on the conditions described in Examples 1 and 2, the scratch lives were significantly prolonged compared to that of the surface layer not irradiated with an electron beam. This is because increase in the hardness reduced an increase in wear depth in the mechanism of generating scratch described above.

Thus, it was verified that as a result of crosslinking through irradiation with an electron beam in the temperature range of 150 to 270° C. described in Examples 1 and 2, the surface layer had higher hardness and a longer scratch life than that of the surface layer not irradiated with an electron beam.

Next, the breakage life was examined. In Comparative Example 1, the surface layer reached the breakage life before the scratch life. This is probably because the irradiation of the surface layer with an electron beam at a temperature equal to or higher than the melting point of the PFA reduced the hardness and the yield stress, leading to the breakage of the surface layer before scratch occurred.

These results showed that the irradiation of the surface layer with an electron beam on the conditions described in Examples 1 and 2 can enhance the scratch life and prolong the breakage life.

Thus, a surface layer having high flexibility and processability and containing crosslinked PFA were provided by the techniques described in Examples 1 and 2 to reduce chipping and breakage of the surface layer by the edge of the printing paper having paper burr in the insertion direction to the fixing apparatus, and thus prolong the life of the surface layer.

[Comparison of Life of Fixing Members in Examples 2 and 3 and Comparative Example 3]

In the next step, the image quality was compared in Examples 2 and 3 and Comparative Example 3.

In Example 3 and Comparative Example 3, cylindrical fixing members were prepared in the same manner as in Example 2 except that the heating temperature and the dose of the electron beam were varied as shown in Table 3.

The Ri values of the uncrosslinked PFA tubes used in preparation of the fixing members and the Rf values of the surface layers formed in Example 3 and Comparative Example 3 were as follows:

Uncrosslinked PFA tube: Ri=2

Surface layer in Example 3: Rf=2

Surface layer in Comparative Example 3: Rf=2

Generally, a higher hardness of the surface layer reduces the followability (contact area) of the surface layer to the printing paper, which may cause generation of unevenness in gloss and concentration of the toner images.

The unevenness of the gloss of the toner image was compared.

The unevenness of the gloss of the toner image was evaluated using the fixing apparatus illustrated in FIG. 2. In the evaluation, the conditions were controlled such that the total pressure was 320 N, the rotational speed of the pressurizing roller was 200 mm/s, and the outer peripheral temperature of a region of the fixing member contacting the printing paper was 150° C. The printing paper used was a sheet CS-814 (manufactured by Nippon Paper Industries Co., Ltd.), and an image having an amount of toner of 1.2 mg/cm$^2$ was fixed. The quality of the fixed image was evaluated for the unevenness of the gloss according to the following criteria:

Criteria for Evaluation

Rank A: The unevenness of the gloss of the fixed image is identical to the reference level, where the level of unevenness of the gloss of the fixed image formed using the fixing member in Comparative Example 2 is defined as an allowable reference level.

Rank B: The unevenness of the gloss of the fixed image is inferior to the reference level, where the level of unevenness of the gloss of the fixed image formed using the fixing member in Comparative Example 2 is defined as an allowable reference level.

The conditions of the fixing surface layers compared, and the results of evaluation of the unevenness of the gloss are as follows:

TABLE 3

| | Resin type | Irradiation with electron beam: Irradiated or not | Heating temperature | Dose | Hardness (N/mm$^2$) | Evaluation of unevenness of gloss Rank |
|---|---|---|---|---|---|---|
| Example 2 | 350-J | Irradiated | 270° C. | 200 kGy | 25 | A |
| Example 3 | 350-J | Irradiated | 150° C. | 400 kGy | 35 | A |
| Comparative Example 3 | 350-J | Irradiated | 150° C. | 600 kGy | 45 | B |

The hardness of the printing paper (CS-814) was measured by the same method as that in the surface layer; the hardness was 40 N/mm$^2$. Generally, the printing paper has a universal hardness of 40 N/mm$^2$. Accordingly, it was verified that the image quality reduces if the hardness of the surface layer is higher than the hardness of the printing paper. Thus, a surface layer having a hardness of 40 N/mm$^2$ or less provided an image quality equivalent to the conventional one.

Example 4

Figure 3B:
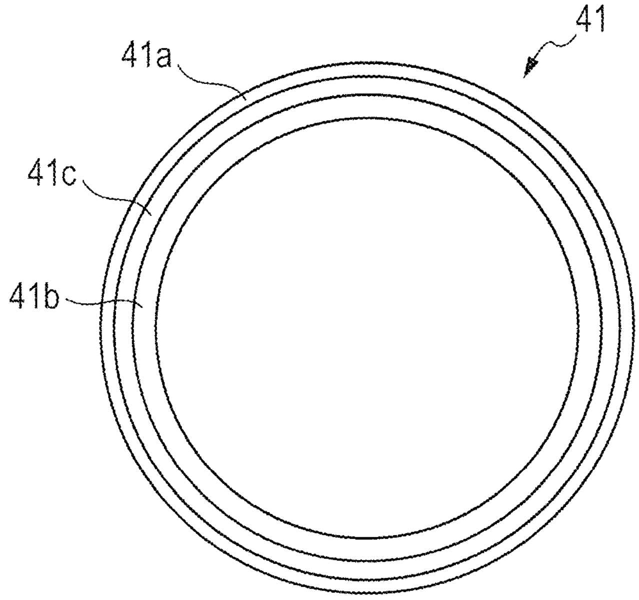

In Example 4, a cylindrical fixing member was prepared in the same manner as in Example 1 except that an elastic layer 41*c* was disposed between a surface layer 41*a* and a substrate layer 41*b* as illustrated in FIG. 3B.

The elastic layer 41*c* was formed using a silicone rubber having a rubber hardness of 10 degrees (JIS-A), a thermal conductivity of 1.3 W/m·K and a thickness of 300 μm to reduce the heat capacity to enhance the quick start properties.

Generally, an elastic layer disposed between the substrate and the surface layer can control the spreading of the melted toner to provide image quality more suitable for the degree of the gloss of the printing paper.

Thus, the disposition of the elastic layer 41*c* prevented chipping of the surface layer by the end of the printing paper, and further enhanced the image quality.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-157649, filed Aug. 10, 2016, which is hereby incorporated by reference herein in its entirety.

What is claimed is:

1. An endless belt-shaped electrophotographic member comprising:

an endless belt-shaped substrate; and a surface layer on the outer peripheral surface of the substrate, wherein the surface layer comprises an ionizing radiation crosslinked product of a tetrafluoroethylene-perfluoroalkyl vinyl ether copolymer, the surface layer is formed by irradiation of electron beam to a resin layer provided on the substrate, the resin layer comprising the tetrafluoroethylene-perfluoroalkyl vinyl ether copolymer, the surface layer has a universal hardness HU at 200° C. of 18 $N/mm^2 \leq HU \leq 40\ N/mm^2$, and when a degree of orientation of the tetrafluoroethylene-perfluoroalkyl vinyl ether copolymer in the resin layer in a direction orthogonal to the circumferential direction of the substrate is defined as Ri, and a degree of orientation of the crosslinked product of the tetrafluoroethylene-perfluoroalkyl vinyl ether copolymer in the surface layer in the direction orthogonal to the circumferential direction of the substrate is defined as Rf, Ri and Rf satisfy a relationship represented by expression (1):

$$Ri \times 0.8 \leq Rf \leq Ri \quad (1)$$

wherein Ri is represented by expression (2):

$$Ri = AR0/AR90 \quad (2)$$

wherein when in polarized spectrum in the direction orthogonal to the circumferential direction of the substrate in an infrared-spectroscopic measurement of the resin layer, an absorption peak value at 640 $cm^{-1}$ is defined as Abs640r0 and an absorption peak value at 993 $cm^{-1}$ is defined as Abs993r0, AR0 is represented by expression (3):

$$AR0 = Abs640r0/Abs993r0 \quad (3)$$

and when in polarized spectrum in the circumferential direction of the substrate in an infrared-spectroscopic measurement of the resin layer, an absorption peak value at 640 $cm^{-1}$ is defined as Abs640r90 and an absorption peak value at 993 $cm^{-1}$ is defined as Abs993r90, AR90 is represented by expression (4):

$$AR90 = Abs640r90/Abs993r90 \quad (4)$$

and Rf is represented by expression (5):

$$Rf = AS0/AS90 \quad (5)$$

wherein when in polarized spectrum in the direction orthogonal to the circumferential direction of the substrate in an infrared-spectroscopic measurement of the surface layer, an absorption peak value at 640 $cm^{-1}$ is defined as Abs640s0 and an absorption peak value at 993 $cm^{-1}$ is defined as Abs993s0, AS0 is represented by expression (6):

$$AS0 = Abs640s0/Abs993s0 \quad (6)$$

and when in polarized spectrum in the circumferential direction of the substrate in an infrared-spectroscopic measurement of the surface layer, an absorption peak value at 640 $cm^{-1}$ is defined as Abs640s90 and an absorption peak value at 993 $cm^{-1}$ is defined as Abs993s90, AS90 is represented by expression (7):

$$AS90 = Abs640s90/Abs993s90 \quad (7).$$

2. The electrophotographic member according to claim 1, wherein the electrophotographic member has an elastic layer between the surface layer and the substrate.

3. The electrophotographic member according to claim 1, wherein the ionizing radiation is an electron beam.

4. The electrophotographic member according to claim 1, wherein the Ri is 1.5 or more and 2.5 or less.

5. A fixing apparatus for heat fixing a toner image comprising:

a pressurizing member; and a fixing member, the fixing member disposed facing the pressurizing member, wherein the fixing member is an endless belt-shaped electrophotographic member comprising an endless belt-shaped substrate and a surface layer on the outer peripheral surface of the substrate, the surface layer comprises an ionizing radiation crosslinked product of a tetrafluoroethylene-perfluoroalkyl vinyl ether copolymer, the surface layer is formed by irradiation of electron beam to a resin layer provided on the substrate, the resin layer comprising the tetrafluoroethylene-perfluoroalkyl vinyl ether copolymer, the surface layer has a universal hardness HU at 200° C. of 18 $N/mm^2 \leq HU \leq 40\ N/mm^2$, and when a degree of orientation of the tetrafluoroethylene-perfluoroalkyl vinyl ether copolymer in the resin layer in a direction orthogonal to the circumferential direction of the substrate is defined as Ri, and a degree of orientation of the crosslinked product of the tetrafluoroethylene-perfluoroalkyl vinyl ether copolymer in the surface layer in the direction orthogonal to the circumferential direction of the substrate is defined as Rf, Ri and Rf satisfy a relationship represented by expression (1):

$$Ri \times 0.8 \leq Rf \leq Ri \quad (1)$$

wherein Ri is represented by expression (2):

$$Ri = AR0/AR90 \quad (2)$$

wherein when in polarized spectrum in the direction orthogonal to the circumferential direction of the substrate in an infrared-spectroscopic measurement of the resin layer, an absorption peak value at 640 $cm^{-1}$ is defined as Abs640r0 and an absorption peak value at 993 $cm^{-1}$ is defined as Abs993r0, AR0 is represented by expression (3):

$$AR0 = Abs640r0/Abs993r0 \quad (3)$$

and when in polarized spectrum in the circumferential direction of the substrate in an infrared-spectroscopic measurement of the resin layer, an absorption peak value at 640 $cm^{-1}$ is defined as Abs640r90 and an absorption peak value at 993 $cm^{-1}$ is defined as Abs993r90, AR90 is represented by expression (4):

$$AR90 = Abs640r90/Abs993r90 \quad (4)$$

and Rf is represented by expression (5):

$$Rf = AS0/AS90 \quad (5)$$

wherein when in polarized spectrum in the direction orthogonal to the circumferential direction of the substrate in an infrared-spectroscopic measurement of the surface layer, an absorption peak value at 640 $cm^{-1}$ is defined as Abs640s0 and an absorption peak value at 993 $cm^{-1}$ is defined as Abs993s0, AS0 is represented by expression (6):

$$AS0=Abs640s0/Abs993s0 \quad (6)$$

and when in polarized spectrum in the circumferential direction of the substrate in an infrared-spectroscopic measurement of the surface layer, an absorption peak value at 640 $cm^{-1}$ is defined as Abs640s90 and an absorption peak value at 993 $cm^{-1}$ is defined as Abs993s90, AS90 is represented by expression (7):

$$AS90=Abs640s90/Abs993s90 \quad (7).$$

6. A method of producing an electrophotographic belt comprising an endless belt-shaped substrate, and a surface layer covering an outer peripheral surface of the substrate, the method comprising:

(i) providing an extruded cylindrical product of a resin material comprising a tetrafluoroethylene-perfluoroalkyl vinyl ether copolymer, (ii) covering the outer peripheral surface of the substrate with the extruded cylindrical product, and (iii) forming a surface layer through crosslinking of the tetrafluoroethylene-perfluoroalkyl vinyl ether copolymer in the extruded cylindrical product through irradiation of an outer surface of the extruded cylindrical product with ionizing radiation in a state where the extruded cylindrical product covering the outer peripheral surface of the substrate is heated to a temperature equal to or higher than a glass transition temperature (Tg) of the tetrafluoroethylene-perfluoroalkyl vinyl ether copolymer and lower than a melting point (Tm) of the tetrafluoroethylene-perfluoroalkyl vinyl ether copolymer, wherein the surface layer has a universal hardness HU at 200° C. of 18 $N/mm^2 \leq HU \leq 40$ $N/mm^2$, and when a degree of orientation of the tetrafluoroethylene-perfluoroalkyl vinyl ether copolymer in the extruded cylindrical product in a direction orthogonal to the circumferential direction of the substrate is defined as Ri, and a degree of orientation of a crosslinked product of the tetrafluoroethylene-perfluoroalkyl vinyl ether copolymer in the surface layer formed in the step (iii), in the direction orthogonal to the circumferential direction of the substrate is defined as Rf, Ri and Rf satisfy a relationship represented by expression (1):

$$Ri\times 0.8\leq Rf\leq Ri \quad (1)$$

wherein Ri is represented by expression (2):

$$Ri=AR0/AR90 \quad (2)$$

wherein when in polarized spectrum in the direction orthogonal to the circumferential direction of the substrate in an infrared-spectroscopic measurement of the extruded cylindrical product, an absorption peak value at 640 $cm^{-1}$ is defined as Abs640r0 and an absorption peak value at 993 $cm^{-1}$ is defined as Abs993r0, AR0 is represented by expression (3):

$$AR0=Abs640r0/Abs993r0 \quad (3)$$

and when in polarized spectrum in the circumferential direction of the substrate in an infrared-spectroscopic measurement of the extruded cylindrical product, an absorption peak value at 640 $cm^{-1}$ is defined as Abs640r90 and an absorption peak value at 993 $cm^{-1}$ is defined as Abs993r90, AR90 is represented by expression (4):

$$AR90=Abs640r90/Abs993r90 \quad (4)$$

and Rf is represented by expression (5):

$$Rf=AS0/AS90 \quad (5)$$

wherein when in polarized spectrum in the direction orthogonal to the circumferential direction of the substrate in an infrared-spectroscopic measurement of the surface layer, an absorption peak value at 640 $cm^{-1}$ is defined as Abs640s0 and an absorption peak value at 993 $cm^{-1}$ is defined as Abs993s0, AS0 is represented by expression (6):

$$AS0=Abs640s0/Abs993s0 \quad (6)$$

and when in polarized spectrum in the circumferential direction of the substrate in an infrared-spectroscopic measurement of the surface layer, an absorption peak value at 640 $cm^{-1}$ is defined as Abs640s90 and an absorption peak value at 993 $cm^{-1}$ is defined as Abs993s90, AS90 is represented by expression (7):

$$AS90=Abs640s90/Abs993s90 \quad (7).$$

7. The method of producing an electrophotographic belt according to claim 6, wherein the temperature lower than the melting point (Tm) is a temperature equal to or lower than a temperature 40° C. lower than the melting point (Tm) (Tm−40° C.).

8. The method of producing an electrophotographic belt according to claim 6, wherein the ionizing radiation is an electron beam.

9. The method of producing an electrophotographic belt according to claim 6, wherein the substrate comprises an elastic layer on a surface of the substrate, and step (ii) comprises covering a surface of the elastic layer with the extruded cylindrical product.

10. The method of producing an electrophotographic belt according to claim 6, wherein the Ri is 1.5 or more and 2.5 or less.

* * * * *